United States Patent Office 3,326,956
Patented June 20, 1967

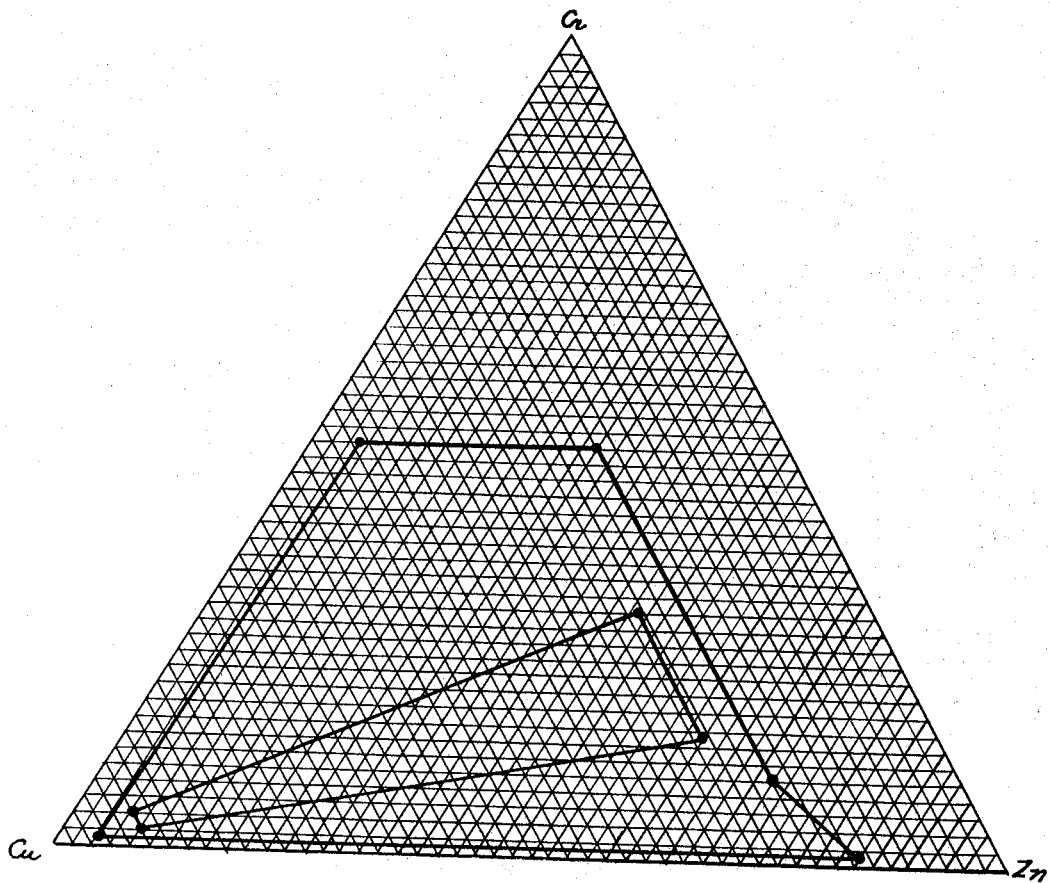
INVENTORS
PHINEAS DAVIES
BY FREDERICK FORSTER SNOWDON
Cushman, Darby & Cushman
ATTORNEYS

3,326,956
PRODUCTION OF OXYGENATED
HYDROCARBONS
Phineas Davies and Frederick Forster Snowdon, Norton-on-Tees, England, assignors to Imperial Chemical Industries Limited, London, England, a corporation of Great Britain
Filed June 3, 1963, Ser. No. 284,861
Claims priority, application Great Britain, June 8, 1962, 22,259/62
11 Claims. (Cl. 260—449.5)

This invention relates to a process for producing oxygenated hydrocarbons, especially methanol.

According to the invention there is provided a process for producing oxygenated hydrocarbons which comprises bringing a substantially sulphur-free gaseous mixture of hydrogen, carbon monoxide and carbon dioxide at elevated temperature and pressure into contact with a catalyst comprising the product of partly reducing the mixed oxides of copper, zinc and chromium.

The oxygenated hydrocarbons which may be produced by the process of the invention include alcohols, aldehydes, ketones and mixtures thereof. Which oxygenated hydrocarbons are produced depends on several factors in the process operating conditions. As a general rule it may be stated that higher temperatures, higher pressures, lower ratios of hydrogen to carbon monoxide and the presence of alkali in the catalyst all appear to varying degrees to favour the formation of the higher molecular weight oxygenated hydrocarbon.

The process of the invention is especially useful for the production of methanol. For producing methanol the substantially sulphur-free gas mixture preferably contains with respect to carbon monoxide at least the stoichiometric concentration and conveniently up to a five-fold excess of hydrogen, the temperature is preferably in the range 200° C.–300° C. especially 220° C.–270° C. and the pressure is preferably in the range 1 to 350 atmospheres absolute, especially 10 to 150 atmospheres and more especially 30 to 120 atmospheres, for example, 40 to 80 atmospheres. For producing methanol and the catalyst is substantially alkali free and preferably contains less than 1% especially less than 0.1% by weight of alkali metal compounds calculated as sodium oxide on the catalyst as dried at 900° C.

The space velocity at which the process is carried out is conveniently in the range 10 to 30,000 and especially 7,000 to 20,000 hour$^{-1}$: these values are calculated to standard temperature 20° and to standard pressure 1 atmosphere and are volume space velocities for example litres per litre of catalyst filled space per hour.

By a substantially sulphur-free gas mixture is meant a mixture containing sulphur or its compounds to the extent of less than about 10 parts per million by weight calculated as sulphur. It is preferred to have present less than 5 parts per million and more preferably less than 1 part per million. Such gas mixtures are produced readily by modern techniques, for example by the reaction of steam with desulphurised hydrocarbons, as described below.

For the process of the invention the ratio of carbon dioxide to carbon monoxide is preferably at least 1:200 for example in the range 2:1 to 1:20. Higher ratios of carbon dioxide to carbon monoxide can also be used if desired.

The catalyst for the reaction of carbon oxides with hydrogen contains copper, zinc and chromium preferably in a ratio falling within the area defined by the perimeter passing through the following points on a triangular phase diagram:

| Cu | Zn | Cr |
|---|---|---|
| 95 | 4 | 1 |
| 15 | 84 | 1 |
| 20 | 70 | 10 |
| 20 | 30 | 50 |
| 45 | 5 | 50 | and especially by a second perimeter laying within the above perimeter and passing through the points

| Cu | Zn | Cr |
|---|---|---|
| 90 | 8 | 2 |
| 25 | 60 | 15 |
| 25 | 45 | 30 |
| 90 | 6 | 4 |

These perimeters are illustrated in the triangular phase diagram shown on the accompanying drawing.

In the diagram the compositions represented are atomic percentages of the total content of copper, zinc and chromium. Where herein reference is made to a percentage copper, zinc or chromium content such a content is a percentage by atoms of the total copper, zinc and chromium. The preferred catalysts thus have a zinc to chromium raito in the range 1.5:1 to 4:1 and a copper content in the range 25%–90%. The copper content of such catalysts is more preferably in the range 45%–85%, especially 55%–75%. Thus as examples of valuable catalysts for use in the process of the invention there may be mentioned those consisting of the product of reducing the mixed oxides of copper, zinc and chromium in the atomic ratio 30:60:10, 40:40:20, 80:15:5 and 72:21:7 in increasing order of preference: catalysts having the ratio 60:30:10 and 75:18:7 are similar to the 72:21:7 catalyst.

The catalyst is preferably produced by co-precipitating the three metals from a solution of their nitrates as one or more compounds readily convertible to oxides. For example the mixed nitrates may be added to a solution of a carbonate. Preferably the precipitation is effected at a temperature above 50° C., especially 80° C.–100° C. Preferably also the mixture has a neutral to mildly alkaline reaction up to pH 10, for example pH 8 (the pH value being measured at room temperature) at the end of the precipitation.

The precipitate when a carbonate is used is a mixture of carbonates, basic carbonates and hydroxides. It is collected on a filter, washed substantially free of electrolytes, then dried and calcined at 200° C.–400° C. to form the oxides of the metals present. The calcined material is formed into pieces by for example pelleting under pressure using graphite as lubricant. Before the oxide mixture can show its full activity as a catalyst it should be partly reduced. This may be effected conveniently by passing a mixture of hydrogen optionally with nitrogen as diluent at atmospheric pressure over the heated oxide mixture in the converter in which the catalyst is to be used.

Particularly suitable catalysts for use in the process of the invention can be made as described in the co-pending application, Ser. No. 284,860, of even date, in the name of Bridger, Hughes and Young.

The catalysts may contain also support materials, diluents or binding materials, of types well known in catalyst-making, but these do not appear to be essential, very satisfactory results being obtained without them.

The process of the invention is advantageous in affording at comparatively low temperatures and pressures higher conversions than otherwise similar processes using an inlet gas containing carbon monoxide but no carbon dioxide. The presence of carbon dioxide moreover increases the duration of the activity of the catalyst. The water formed by the hydrogenation of the carbon dioxide is readily removed from the product.

Owing to the advantageous effect of the presence of carbon dioxide the inlet gas for the process of the invention is very conveniently a gas stream produced by reacting a hydrocarbon with steam at a high temperature, possibly in the presence of oxidising gases. Thus the invention includes as a preferred embodiment the combination of the process already described with a process producing a mixture of carbon oxides and hydrogen by reacting steam with a hydrocarbon over a catalyst at elevated temperature. These conditions for the reaction of steam with hydrocarbons are hereinafter referred to as primary reforming conditions.

Thus in an important form the invention provides a process for the production of oxygenated hydrocarbons and especially of methanol which comprises desulphurising a hydrocarbon feedstock to a sulphur content of less than 10 parts per million by weight of sulphur, reacting the treated feedstock with steam under primary reforming conditions to give a gas mixture consisting essentially of hydrogen, carbon monoxide, carbon dioxide and excess steam, at least partly removing the steam, and passing the remainder of the gas mixture at elevated temperature and pressure over a catalyst comprising the product of partly reducing the mixed oxides of copper, zinc and chromium.

The hydrocarbon feedstock preferably boils in the range up to about 220° C. and is conveniently the straight run distillation fraction of petroleum which is known as light distillate. It is desulphurised preferably to less than 2 parts per million by weight of sulphur. A suitable desulphurisation technique is described in United Kingdom Patent No. 902,148.

The steam ratio at the primary reforming stage preferably corresponds to more than 2, for example 2 to 5 molecules of steam per atom of carbon in the feedstock; and such a steam ratio can be used at temperatures between 550° C. and 950° C. at pressures between 1 and 50 atmospheres, using a supported nickel catalyst for example as described in our co-pending British specifications Nos. 916,216, 908,505, and 953,877.

For the production of oxygenated hydrocarbons it is desirable to minimise the methane content of the gas which is formed in the primary reforming process since methane does not undergo any useful reaction in the presence of the copper-zinc-chromium catalyst. For this purpose it is preferred to operate the primary reforming stage under conditions within the following ranges.

Temperature: 800° C.–950° C.; that is, toward the upper end of the above mentioned range;
Pressure: 5–20 atmospheres, for example 10–15 atmospheres; that is, toward the lower end of the above mentioned range;
Steam ratio: at least 3 molecules of steam per atom of carbon in the feedstock.

For such a primary reforming process the feedstock is conveniently desulphurised to an extent such that no further desulphurisation of the gas to be passed over the copper-zinc-chromium catalyst is necessary.

The ratio of hydrogen to carbon oxides in the gas fed to the copper-zinc-chromium catalyst may be adjusted if desired by the addition of carbon monoxide or carbon dioxide or both, or of hydrogen, from a source other than the primary reformer supplying the bulk of the gas used. A content of carbon dioxide may be provided or increased if desired by the addition of steam to synthesis gas stream containing carbon monoxide but no or insufficient carbon dioxide.

The process of the invention in the preferred form in which a methanol synthesis process is combined with a primary reforming process provides a simple and economically attractive methanol synthesis plant, which may be independent of other manufactures such as for example ammonia.

This invention is illustrated by the following examples.

EXAMPLE 1

The vapour of a hydrocarbon feedstock consisting of a light petroleum distillate of approximate empirical formula $CH_{2.3}$ and having a boiling range 35° C.–175° C. was desulphurised as described in U.K. Patent No. 902,148 and reacted with steam in a converter charged with a supported nickel catalyst; the converter was maintained at 900° C. by an external heat source.

The exit gas, consisting of 67% $H_2$, 16.5% CO, 12.6% $CO_2$, 3.5% $CH_4$ and excess steam was passed through a condenser to remove the bulk of the steam, compressed to 40 atmospheres, then passed through a bed of adsorptive charcoal to the synthesis converter in which at 225° C.–260° C. and with a space velocity of 6000–7000 hour$^{-1}$ it contacted a catalyst containing copper, zinc and chromium in the ratio of 40:40:20 by atoms. The sulphur content of the inlet gas was 0.06 part per million. The catalyst had been made as described below.

The exit gas from this converter was cooled to condense out methanol and water and the uncondensed gas was recycled to the converter. It was calculated that the pass conversion was 10%–12% and that the rate of production of methanol was 0.26 kilogram per litre of catalyst per hour.

Further trials were carried out using the same catalyst and converter but at the higher space velocity of 10,000 hour$^{-1}$ and over a range of pressures. It was found that at this space velocity methanol was produced at the following rates per litre of catalyst:

at 40 atmospheres pressure—0.38 kilogram per hour
at 80 atmosphere pressure—over 0.77 kilogram per hour Under all these experimental condition the methanol contained less than 0.1% of organic impurities.

The catalyst for the methanol synthesis stage had been made as follows:

A mixed solution of copper, zinc and chromium nitrates at 90° C. was added to a solution of sufficient sodium carbonate at 90° C. to give a pH of 7 to 7.2 at the end of the mixing. The precipitate was collected on a filter, washed thoroughly, dried, calcined at 265° C. and pelleted with graphite to give cylinders 3/16″ x 3/16″. The pelleted material was then charged to the converter and subjected to a current of hydrogen at atmospheric pressure and a temperature gradually rising to 250° C. until no further reduction took place. The alkali content of the catalyst as dried at 900° C. was 0.2% by weight expressed as sodium oxide.

EXAMPLE 2

*Effect of carbon dioxide in the conversion of carbon monoxide to methanol*

(a) *Effect on conversion.*—A converter was charged with a catalyst containing copper, zinc and chromium in the ratio 40:40:20 by atoms, which had been made as described in Example 1 except that reduction was carried out by means of a mixture of 25% carbon monoxide and 75% hydrogen at 100 atmospheres pressure, raising the temperature very gradually to 250° C. Then the same gas mixture was passed through the converter at a space velocity of 25,000 hour$^{-1}$ and the product methanol collected, weighed and analysed. It was found that with a carbon dioxide content of 0.02% (that is, substantially zero) the conversion of carbon oxides to methanol was initially 9.0% falling in a few days to 8.5%. At this point the carbon dioxide content was raised to 0.31%: the conversion at once rose to 19.5% from which it fell to 18% after a few days. The effect appeared to be reversible since when later the carbon dioxide content was decreased to its former value the conversion fell to rather less than its initial value at the lower carbon dioxide content. The product obtained using this catalyst contained less than 0.5% of organic impurities.

This run was repeated except that a catalyst having the composition copper 60:zinc 30:chromium 10 was used. This catalyst had been made as described in the co-pending application, Ser. No. 284,860, of even date, in the name of Bridger, Hughes and Young. A similar effect was observed, the conversion rising from 6.5% to 18% on the addition of the carbon dioxide. The product obtained using this catalyst also contained less than 0.5% of organic impurities.

(b) *Effect on duration of activity of catalyst.*—Samples of a batch of catalyst containing copper, zinc and chromium in the ratio 40:40:20 by atoms, which had been made as described in Example 1, were reduced by, and then used to convert to methanol, three synthesis gas mixtures differing in carbon dioxide content. The percentage conversions of carbon monoxide to methanol at a pressure of 50 atmospheres absolute, temperature of 250° C. and a space velocity of 25,000 hour$^{-1}$ are given in the table below. (In calculating the percentage conversion for the third gas mixture, account has been taken of the carbon monoxide derived from carbon dioxide by the reverse water-gas shift reaction.)

| Gas Mixture, Percent | | | Percentage Conversion | | |
|---|---|---|---|---|---|
| CO | CO$_2$ | H$_2$ | Initial | After 62 hrs. | After 180 hrs. |
| 25 | 0 | 75 | 5.0 | 3.0 | 1.9 |
| 24.7 | 0.2 | 75 | 11.9 | 9.5 | 7.2 |
| −24.8 | −0.3 | | | | |
| 15 | 10 | 75 | 15.0 | 12.0 | 12.0 |

It is clear that with carbon dioxide present the tendency of the activity of the catalyst to fall is considerably decreased.

EXAMPLE 3

*Methanol synthesis using preferred catalysts*

(a) Using a catalyst having the composition by atoms copper 60:zinc 30:chromium 10 and containing 0.05% of alkali expressed as sodium oxide on the catalyst dried at 900° C., a methanol synthesis run was carried out at a space velocity of 16,000 hour$^{-1}$, a temperature of 250° C.–260° C. and a pressure of 40 atmospheres. The synthesis gas had the same initial composition as that used in Example 1 of the present application, but owing to recirculation in the apparatus the methane content built up gradually and was kept steady at about 10%–11% by purging. The catalyst for this run was a preferred catalyst made as described in Example 1 of a co-pending application, Ser. No. 284,860, of even date, in the name of Bridger, Hughes and Young. The initial steady production of methanol was 0.5 kilogram per litre of catalyst per hour. After 3300 hours' operation the methanol production rate was still 0.36 kilogram per litre of catalyst per hour, despite a number of accidental shutdowns: this was raised to 0.39 kilogram by a 10° C. increase in operating temperature. The proportion of organic impurities in the methanol remained very low throughout the run.

(b) In another synthesis run there was used a catalyst made by the method described in Example 1 of the same co-pending application but with appropriate adjustment of the quantities of the starting materials to give the composition copper 7:zinc 18:chromium 7. The space velocity, temperature and pressure were the same as described in paragraph (a) above. The initial methanol yield was 0.61 kilogram per litre of catalyst per hour; and this was observed to decrease no more rapidly than when using the catalyst of paragraph (a) above. The proportion of organic impurities in the methanol was again very low throughout the run.

We claim:

1. A process for producing methanol which comprises contacting a substantially sulphur-free gaseous mixture of carbon monoxide, carbon dioxide and hydrogen, wherein the hydrogen is presented in at least a stoichiometric equivalent to the carbon monoxide, and wherein the ratio of carbon dioxide to carbon monoxide is at least 1:200, at a temperature of about 200° C. to 300° C. and a pressure in the range of about 1 to about 350 atmospheres absolute with a substantially alkali-free catalyst comprising the product of partly reducing the mixed oxides of copper, zinc and chromium, wherein the catalyst contains copper, zinc and chromium in an atomic ratio falling within the area of a triangular phase diagram defined by the following points:

| Cu | Zn | Cr |
|---|---|---|
| 95 | 4 | 1 |
| 15 | 84 | 1 |
| 20 | 70 | 10 |
| 20 | 30 | 50 |
| 45 | 5 | 50 |

2. A process according to claim 1 wherein the pressure is in the range 10 to 150 atmospheres.

3. A process according to claim 2 wherein the pressure is in the range 30 to 120 atmospheres.

4. A process according to claim 1 wherein the space velocity is in the range 7000 to 20,000 litres per litre of catalyst filled space per hour.

5. A process according to claim 1 wherein the sulphur content of the gaseous mixture is less than 5 parts per million by weight.

6. A process according to claim 5 wherein the sulphur content of the gaseous mixture is less than 1 part per million by weight.

7. A process according to claim 1 wherein the ratio of carbon dioxide to carbon monoxide is within the range of 2:1 to 1:20.

8. A process according to claim 1 wherein the catalyst contains copper, zinc and chromium in a ratio by atoms falling within the area of a triangular phase diagram defined by the perimeter joining the points having the co-ordinates

| Cu | Zn | Cr |
|---|---|---|
| 90 | 8 | 2 |
| 25 | 60 | 15 |
| 25 | 45 | 30 |
| 90 | 6 | 4 |

9. A process according to claim 1 wherein the ratio of zinc to chromium is in the range 1.5:1 to 4:1.

10. A process according to claim 9 wherein the copper content is in the range 45%–85% of the total copper +zinc+chromium.

11. A process according to claim 10 wherein the copper content is in the range 55%–75% of the total copper +zinc+chromium.

(References on following page)

References Cited

UNITED STATES PATENTS

| | | | |
|---|---|---|---|
| 1,754,371 | 4/1930 | Stengel | 260—449.5 |
| 2,061,470 | 11/1936 | Larson | 260—449.5 X |
| 2,355,366 | 8/1944 | Conn. | |
| 2,894,826 | 7/1959 | Stengel | 260—449.5 X |
| 2,940,840 | 6/1960 | Shapleigh | 48—215 |
| 3,064,029 | 11/1962 | White | 260—449.5 |
| 3,071,453 | 1/1963 | James | 252—373 X |

FOREIGN PATENTS

| | | |
|---|---|---|
| 229,715 | 2/1925 | Great Britain. |
| 308,181 | 3/1929 | Great Britain. |

OTHER REFERENCES

Kastens et al.: "Industrial and Engineering Chemistry," vol. 40, No. 12, pp. 2230–2240, December 1948.

Natta: "Catalysis III," p. 4, Emmett, editor, vol. III, 1955, chapter 8, pp. 373–378, 384, 392 and 402.

Ogino et al.: Bulletin Chemical Society, Japan, vol. 33, No. 3 (1960), pp. 358–363.

LEON ZITVER, *Primary Examiner.*

DANIEL D. HORWITZ, *Examiner.*

H. T. MARS, *Assistant Examiner.*